United States Patent
Sugden (10) Patent No.: US 8,462,147 B2
(45) Date of Patent: Jun. 11, 2013

(54) MEGA-MESH SCULPTING FOR ENVIRONMENTS

(75) Inventor: Ben Sugden, Gilford (GB)

(73) Assignee: Microsoft Corporation, Redmond, WA (US)

(*) Notice: Subject to any disclaimer, the term of this patent is extended or adjusted under 35 U.S.C. 154(b) by 939 days.

(21) Appl. No.: 12/559,973

(22) Filed: Sep. 15, 2009

(65) Prior Publication Data
US 2011/0065506 A1  Mar. 17, 2011

(51) Int. Cl.
G06T 15/00 (2011.01)
(52) U.S. Cl.
USPC .......................................... 345/419; 715/757
(58) Field of Classification Search
USPC .......................................... 345/419; 715/757
See application file for complete search history.

(56) References Cited

U.S. PATENT DOCUMENTS

| 7,259,761 | B2 | 8/2007 | Shih et al. |
|---|---|---|---|
| 7,400,331 | B2 | 7/2008 | Levene et al. |
| 2008/0218512 | A1 | 9/2008 | Alon |
| 2009/0153552 | A1 | 6/2009 | Fidaleo et al. |

OTHER PUBLICATIONS

Brandstetter, "Multi-Resolution Deformation in Out-of-Core Terrain Rendering" University of Nevada, Reno, Dec. 2007; pp. 1, 37-38.*
Ehmann, "A Touch-Enabled System for Multiresolution Modeling and 3D Painting," The Journal of Visualization and Computer Animation, 2001, pp. 1, 3, 5-6, 10.*
"Autodesk Mudbox 2009: Digital Sculpting and Texture Painting Software", Retrieved at <<http://www.dexigner.com/digital/news-g15369.html>>, Jul. 8, 2009, pp. 1-2.
Raitt, et al. , "Digital Sculpture Techniques", Retrieved at <<http://www.theminters.com/misc/articles/derived-surfaces/derived-surfaces.pdf>>, Interactivity Magazine, Aug. 1998, pp. 1-13.
"ZBrush Connection", Retrieved at <<http://www.brilliant-creations.com/zbrushtutorial.htm>>, Jul. 8, 2009, pp. 1-5.
Raffin, et al. , "VirSculpt: A Virtual Sculpting Environment", Retrieved at <<http://www.graphicon.ru/2004/Proceedings/Technical/s3%5B4%5D.pdf>>, Proceedings of the 2004 International Conference on Graphicon, Sep. 6-10, 2004, pp. 4.
Perng, et al. , "A Real-Time 3D Virtual Sculpting Tool Based on Modified Marching Cubes", Retrieved at <<http://www.vrsj.org/ic-at/papers/01064.pdf>>, In Proceedings of International Conference on Artificial Reality and Tele-existence, vol. 1, 2001, pp. 9.
"Using Textures to Generate Mesh Geometry in Zbrush 2", Retrieved at <<http://www.surlybird.com/tutorials/textogeometry/index.html>>, Jul. 8, 2009, pp. 1-46.

* cited by examiner

Primary Examiner — Maurice L McDowell, Jr.
(74) Attorney, Agent, or Firm — Alleman Hall McCoy Russell & Tuttle LLP (57) ABSTRACT

A method for sculpting a three-dimensional, graphical environment. The method comprises receiving structure data that structurally defines the graphical environment at a first resolution, and storing composite data based on the structure data received. The composite data includes a first subset defining the graphical environment at the first resolution. The method further comprises exporting section-localized data based on the composite data, the section-localized data defining a section of the graphical environment at least structurally, and receiving refined section-localized data defining a section of the graphical environment at a second resolution finer than the first resolution. The method further comprises augmenting the composite data to include a second subset, which, in combination with the first subset, defines at least the section at the second resolution, according to the refined section-localized data received.

20 Claims, 9 Drawing Sheets

MEGA-MESH SCULPTING FOR ENVIRONMENTS

BACKGROUND

Continuing advances in computer hardware and software have enabled the construction of increasingly complex virtual realities. In fields as varied as video gaming, computer-assisted drafting (CAD), and molecular modeling, virtual realities immerse their visitors in true-to-life, three-dimensional, graphical environments. Constructing such environments is not a trivial undertaking; it requires the work of artists using specialized content-creation tools. Using such tools, the artists create data assets readable by one or more end-use applications—video game applications, client applications, and the like. These data assets enable the end-use application to render the graphical environment on a display.

When large or highly detailed graphical environments are created, the procedures referred to above may involve processing vast amounts of data. Using current technologies, they may require a significant commitment of server resources and even then be undesirably time-consuming.

SUMMARY

Therefore, one embodiment provides a method for sculpting a three-dimensional, graphical environment. The method comprises receiving structure data that structurally defines the graphical environment at a first resolution, and storing composite data based on the structure data received. In this method, the composite data includes a first subset defining the graphical environment at the first resolution. The method further comprises exporting section-localized data based on the composite data, the section-localized data defining a section of the graphical environment at least structurally, and receiving refined section-localized data defining a section of the graphical environment at a second resolution finer than the first resolution. The method further comprises augmenting the composite data to include a second subset, which, in combination with the first subset, defines at least the section at the second resolution, according to the refined section-localized data received.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The subject matter of the present disclosure is now described by way of example and with reference to certain illustrated embodiments. It will be noted that the drawings included in this disclosure are schematic and approximate. Views of the illustrated embodiments are generally not drawn to scale; aspect ratios, feature size, and numbers of features may be purposely distorted to make selected features or relationships easier to appreciate.

Figure 1:
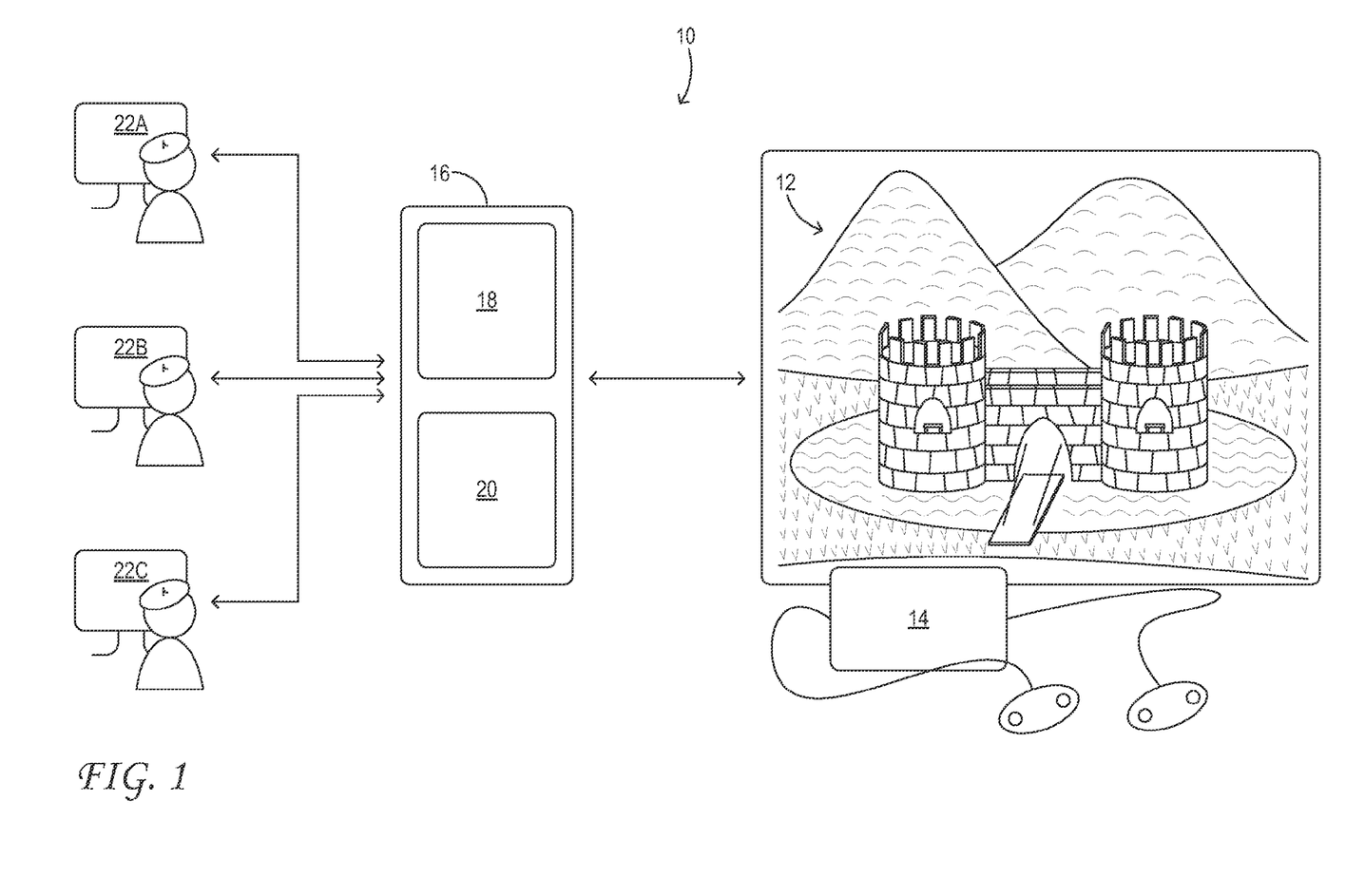
FIG. 1 schematically shows aspects of an example content-creation environment in accordance with an embodiment of the present disclosure.

FIG. 1 schematically shows aspects of an example content-creation environment 10 used for sculpting a three-dimensional (3D) graphical environment; the methods and processes disclosed hereinafter may be tied to and enacted within the content-creation environment.

In the embodiment shown in FIG. 1, an example graphical environment 12 is presented and explored via game system 14. Accordingly, the graphical environment sculpted in content-creation environment 10 may provide at least some of the graphical content of a video game. In this context, a 'graphical environment' is distinguished from other graphical content of the video game, which could include animated characters, for example. It will be understood, however, that the present disclosure is not limited to gaming applications; its subject matter applies generally to any application where the natural scale of a graphical environment varies from one part of the environment to another.

In the embodiment shown in FIG. 1, content-creation environment 10 includes server 16; the server comprises data-holding subsystem 18 and logic subsystem 20. The data-holding subsystem is configured to store the various data structures involved in sculpting and rendering graphical environment 12. The data-holding subsystem may include optical memory, semiconductor memory, and/or magnetic memory, among others; it may include volatile and/or nonvolatile memory, dynamic and/or static memory, read/write and/or read-only memory; it may include random access, sequential access, location addressable, file addressable, and/or content addressable memory. Further, the data-holding subsystem may comprise one or more physical devices—removable media, built-in devices, or any combination thereof—configured to hold data and/or instructions executable by logic subsystem 20 to implement the herein described methods and processes. When such methods and processes are implemented, the detailed electronic, optical and/or magnetic state of the data-holding subsystem may be transformed, such that it holds different data.

Logic subsystem 20 comprises one or more physical devices configured to execute instructions. For example, the logic subsystem may comprise one or more processors. The processors may be configured to write to and read from the data-holding subsystem in the course of executing the instructions. The logic subsystem may be configured to execute instructions that are part of one or more programs, routines, objects, components, data structures, and/or other logical constructs. Such instructions may be implemented to perform a task, implement a data type, transform the state of one or more devices, or otherwise arrive at a desired result. The logic subsystem may be configured to execute software instructions. Additionally or alternatively, the logic subsystem may include one or more hardware or firmware logic machines configured to execute hardware or firmware instructions.

Although shown in the drawing as discrete boxes within server 16, data-holding subsystem 18 and logic subsystem 20 may be functionally distributed in any number of physical devices located anywhere. Accordingly, the known principles of distributed memory and distributed processing are fully applicable to the present disclosure. Conversely, the data-holding subsystem and the logic subsystem may, in some embodiments, be integrated into one or more common devices, such as an application specific integrated circuit or a system-on-a-chip.

Server 16 is shown operatively linked to client devices 22A, 22B, and 22C; other embodiments may include more or fewer client devices. Each client device may be a terminal, a workstation, a desktop or laptop computer, etc. Using the client devices, one or more artists (e.g., draftsmen, application developers, game developers, etc.) may contribute to the sculpting of graphical environment 12. In doing so, the one or more artists may use content-creation software stored on server 16 or on any of the client devices. FIG. 1 particularly shows a content-creation environment where a plurality of artists may work simultaneously on the same graphical environment. In other embodiments, however, a graphical environment may be created by a single artist, or by multiple artists working one at a time. In some such embodiments, the functionality ascribed herein to the server and the various client devices may be collapsed into any single computing system.

The ensemble of client devices 22A, 22B, 22C, etc., may include one or more display subsystems; game system 14 will also include a display subsystem. The various display subsystems may include one or more display devices utilizing virtually any type of technology. In some embodiments, a display device may be combined with data-holding subsystem 18 and/or logic subsystem 20 in a shared enclosure, or such display devices may be peripheral. The one or more display subsystems may be used to present a visual representation of data held by data-holding subsystem 18. As the herein described methods and processes change the data held by the data-holding subsystem, and thus transform the state of the data-holding subsystem, the state of the one or more display subsystems may likewise be transformed to visually represent changes in the underlying data.

The terms 'module' and 'engine' may be used to describe an aspect of content-creation environment 10 that is enacted to perform one or more particular functions. In some cases, such a module or engine may be instantiated via logic subsystem 20 executing instructions held by data-holding subsystem 18. It will be understood that different modules and/or engines may be instantiated from the same application, code block, object, routine, and/or function. Likewise, the same module and/or engine may be instantiated by different applications, code blocks, objects, routines, and/or functions in some cases.

Figure 2:
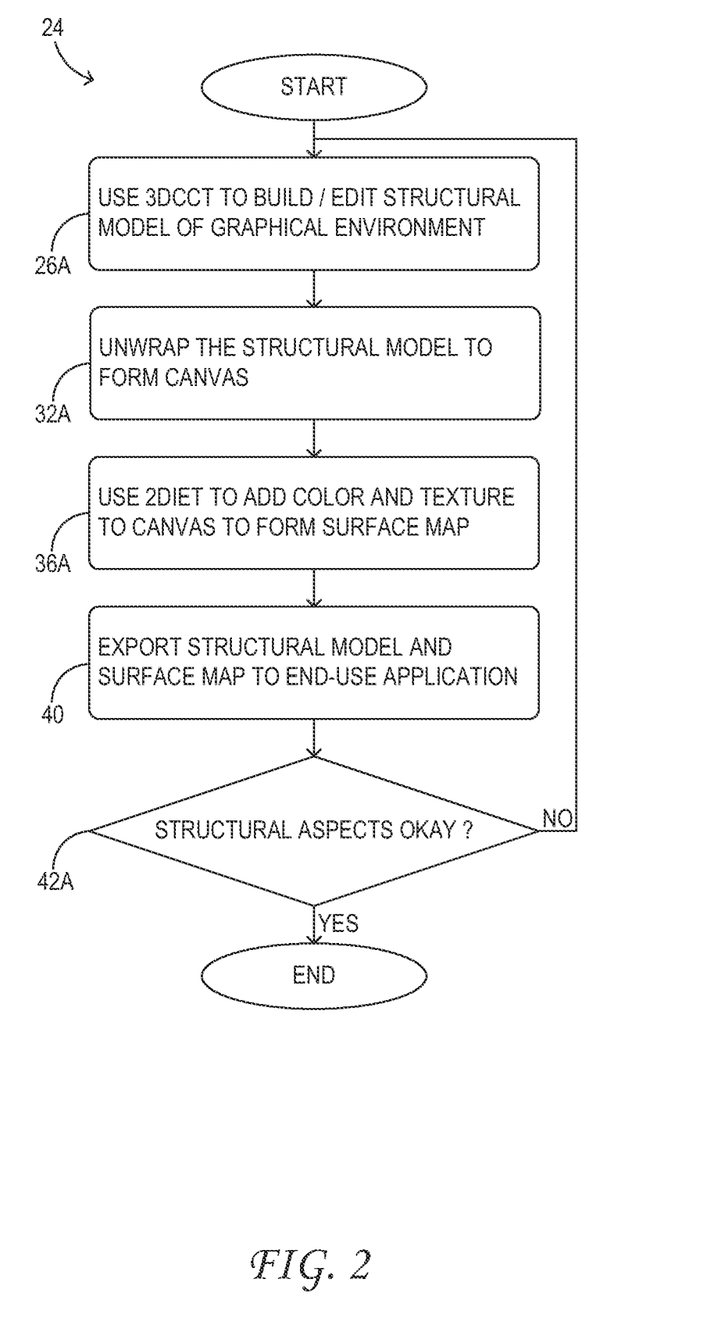
FIG. 2 illustrates a reference method for sculpting a graphical environment.

The advantages of the approaches disclosed herein will be more easily understood with reference to an existing method for creating a graphical environment. Therefore, FIG. 2 illustrates reference method 24. Some of the data structures that may evolve as the reference method is executed are illustrated by example in FIG. 3. The reference method begins at 26A, where a 3D content-creation tool (3DCCT) is used to build a structural model, which structurally defines graphical environment 12; in doing so, the 3DCCT outputs 3D structure data. The term 'structure data' is applied herein to data of sufficient dimensionality to define a set of non-coplanar points. 3DCCT's suitable for this purpose include SoftImage XSI®, Autodesk 3DS MAX®, and Maya® (products of Autodesk, Inc., and Noesis Interactive, respectively).

Figure 3:
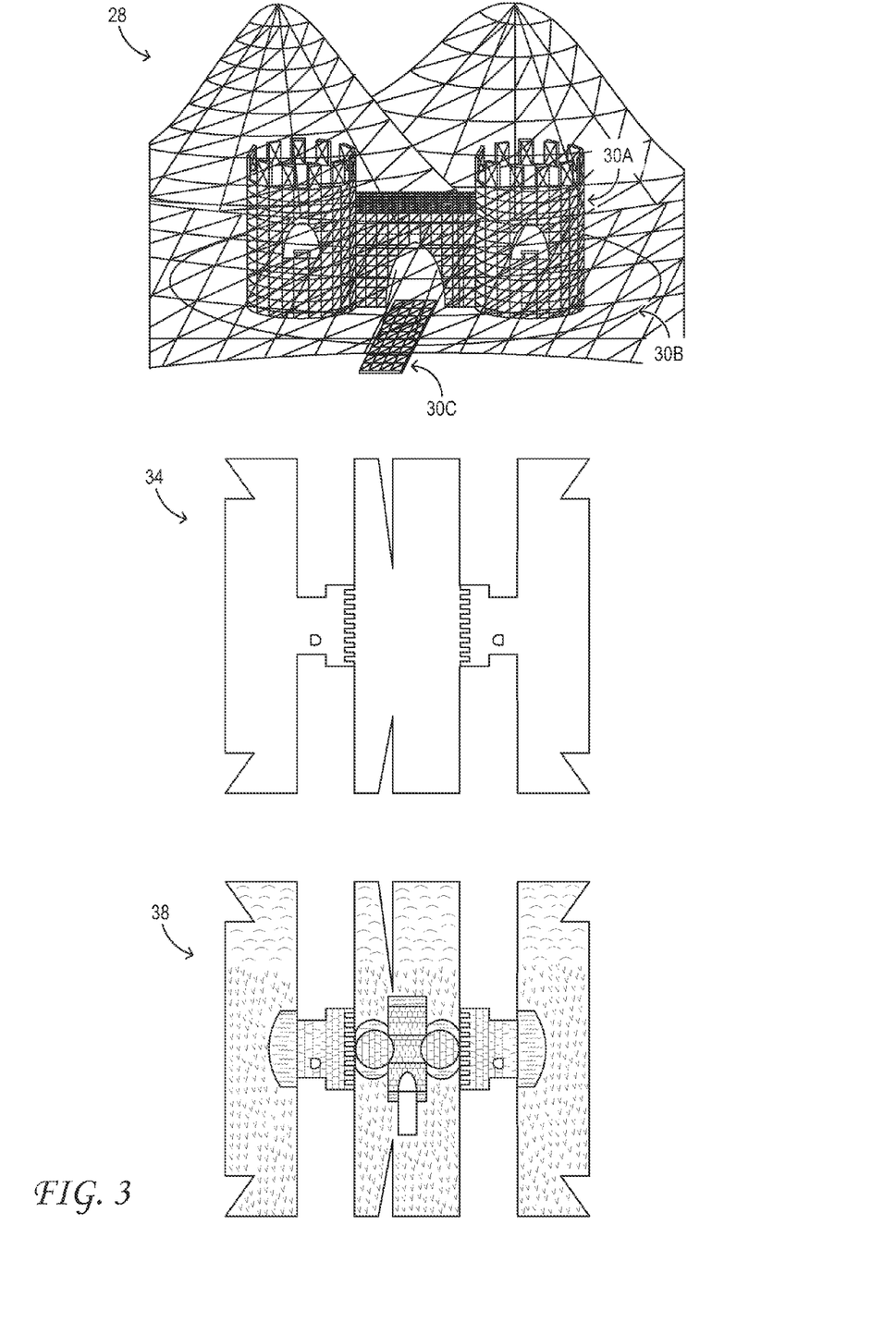
FIG. 3 schematically shows some of the data structures that may evolve as the above reference method is executed.

An example structural model 28, which could be formed using the 3DCCT, is shown schematically in FIG. 3. The structural model comprises an assembly of polygons spanning the graphical environment. In the illustrated embodiment, each polygon has three vertices, with contiguous polygons sharing one or more vertices. In other embodiments, some or all of the polygons may have more than three vertices.

In the structure data underlying structural model 28, each vertex is assigned Cartesian coordinates (x, y, z), such that the assembly of polygons forms a three-dimensional network. Further, the polygons of the structural model may be grouped together in any convenient way. In the embodiment illustrated in FIG. 3, clusters of contiguous polygons representing discrete objects are grouped together and are identified in the drawing by number: cluster 30A, cluster 30B, cluster 30C, etc.

Returning now to FIG. 2, reference method 24 advances to 32A, where the 3DCCT is used to generate a two-dimensional (2D) canvas based on structural model 28. To this end, the 3DCCT may invoke a procedure known in the art as 'uv unwrapping,' wherein the Cartesian coordinates (x, y, z) of each vertex of the structural model are mapped onto corresponding coordinates (u, v) of the canvas. FIG. 3 schematically shows an example canvas 34, which could be formed in this manner from structural model 28.

Reference method 24 then advances to 36A, where the canvas formed via uv unwrapping is imported into a 2D image editing tool (2DIET). Using the 2DIET, one or more artists may paint the canvas, filling in surface aspects such as color and texture. In particular, areas of the canvas are painted with those aspects desired for corresponding areas on the surface of the structural model. The result is a conformal surface map. FIG. 3 shows a simplified version of an example surface map 38, which could be formed from canvas 34. Example 2DIET's suitable for painting the desired surface aspects on the canvas include Photoshop®, a product of Adobe, Inc.

Turning back to FIG. 2, reference method 24 then advances to 40, where structural model 28 and surface map 38 are both exported in formats readable by an end-use application (e.g. game system 14). With access to structural model 28 and surface map 38, the end-use application will, at run time, re-wrap areas of the surface map around corresponding clusters of the structural model, so as to render graphical environment 12 in the desired color(s) and texture(s).

Reference method 24 then advances to 42A, where graphical environment 12, as rendered by the end-use application, is inspected to determine whether or not the various structural aspects are satisfactorily represented. If the structural aspects of the graphical environment are satisfactorily represented, then the reference method concludes. However, if the structural aspects are not satisfactorily represented, then the reference method returns to 26A, where structural model 28 is further modified. Modification of the structural model may involve translating, rotating, or replacing one more clusters, for example. In another example, modification of the structural model may involve editing one or more clusters to increase or decrease the number of polygons it comprises. In many cases, modifying the structural model will change its overall geometry so that it no longer fits surface map 38. As a result, an entirely new canvas is again formed at 32A, by repeated application of the uv unwrapping procedure, which may be time consuming and resource-intensive. Moreover, it may be difficult or in some cases impossible for an artist to copy onto a new, differently shaped canvas the detail work already done on the existing surface map. These factors limit the productivity of artists when using reference method 24 to create a graphical environment.

Figure 4:
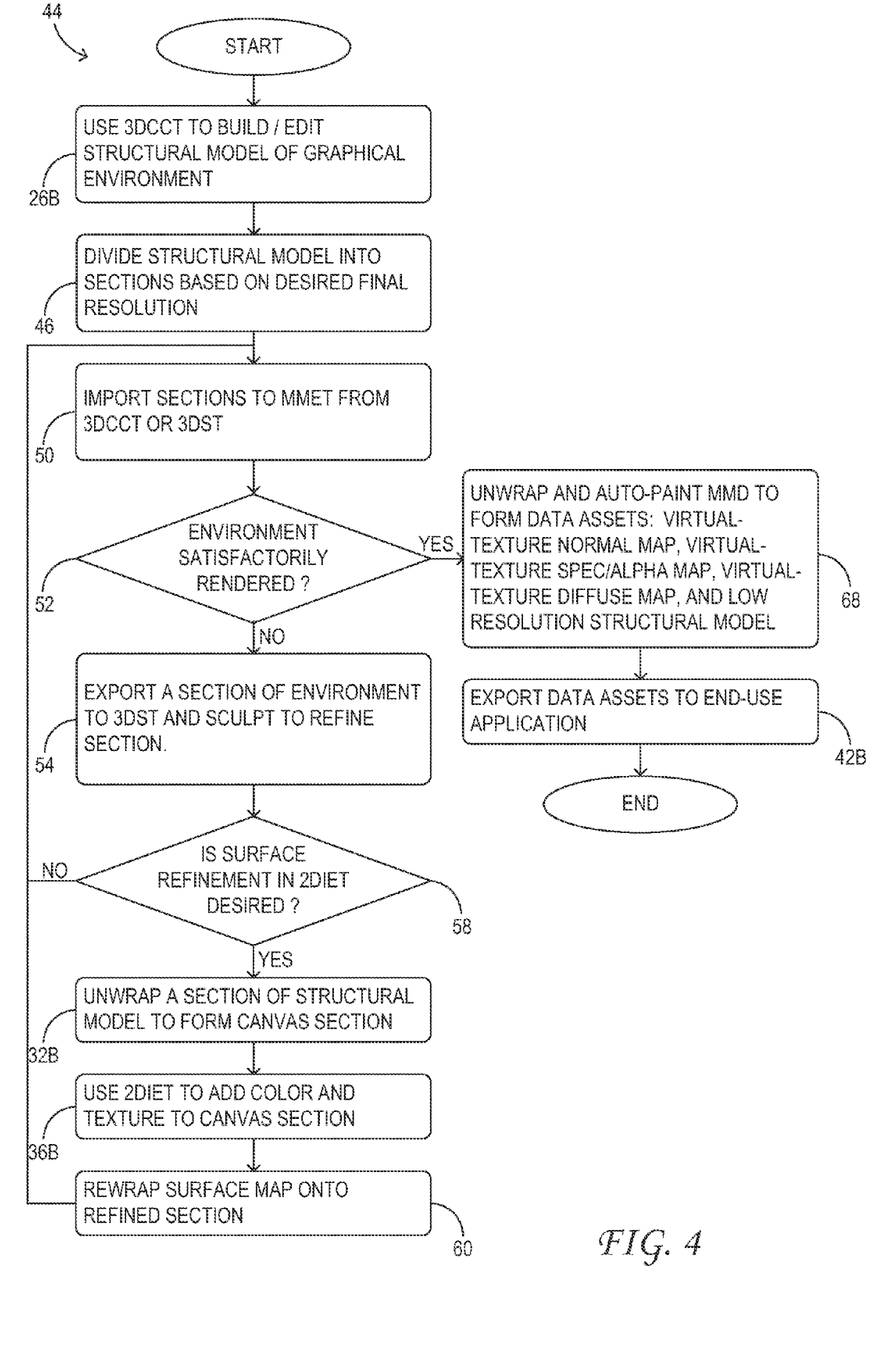
FIG. 4 illustrates a method for sculpting a graphical environment in accordance with an embodiment of the present disclosure.
Figure 5:
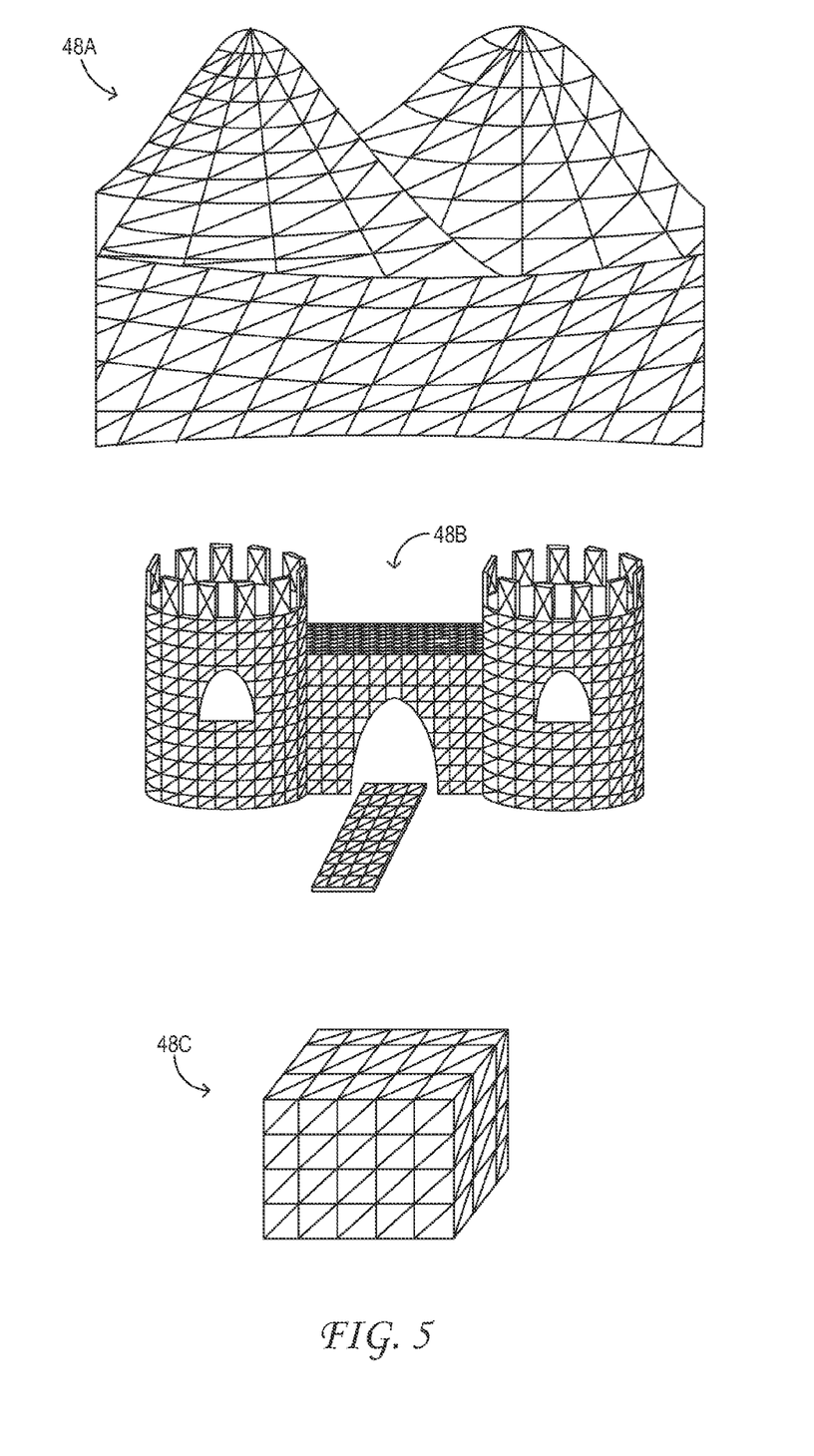
FIGS. 5 and 6 schematically shows some of the data structures that may evolve as the above method is executed.
Figure 6:
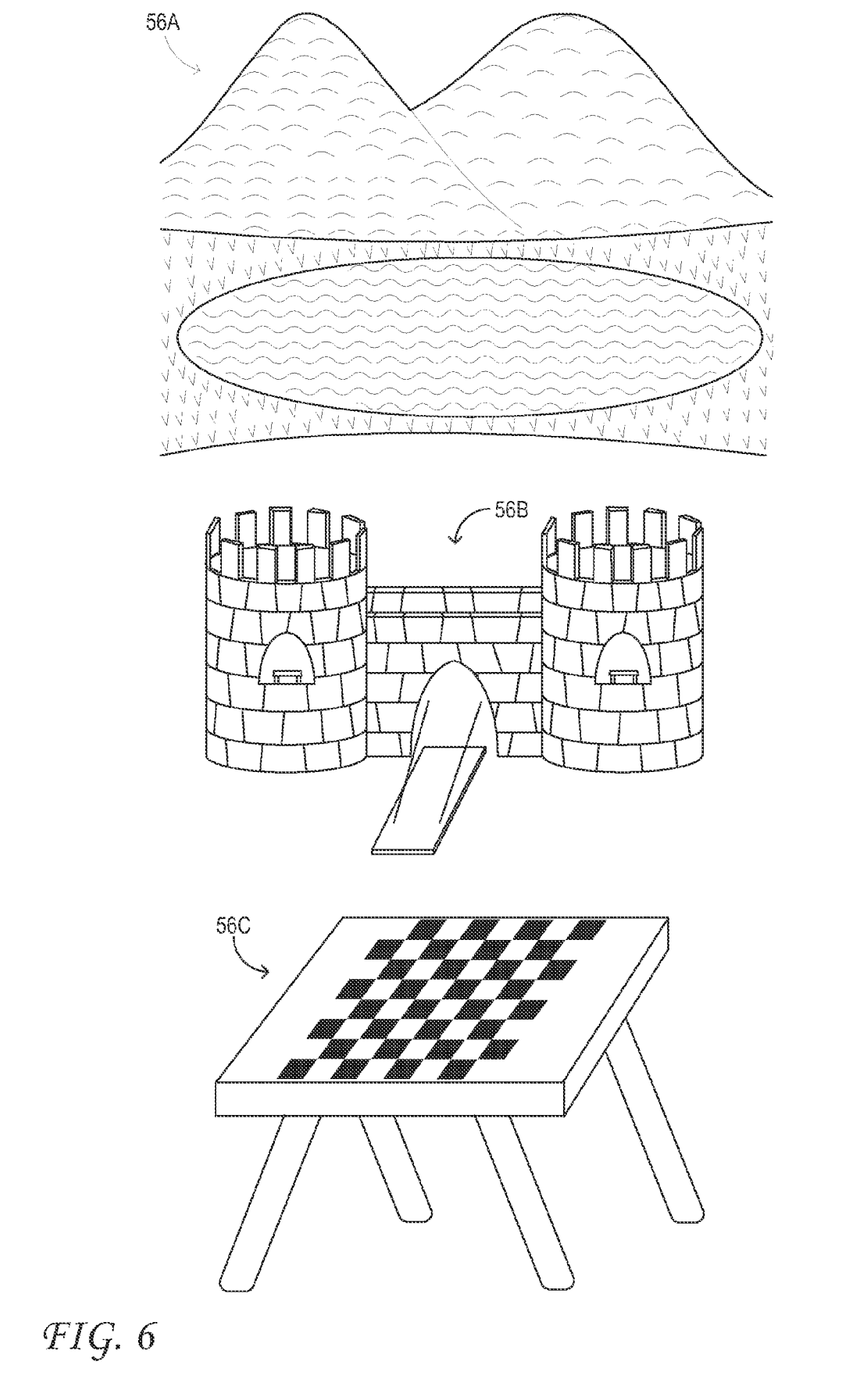

In view of the issues of reference method 24, as noted above, a fundamentally different approach for creating a graphical environment is provided herein. Accordingly, FIG. 4 illustrates method 44 for sculpting a three-dimensional, graphical environment. Aspects of method 44 that may be substantially the same as those of the reference method are identified coordinately and are described with minimal repetition. It will be noted, however, that aspects identified coordinately in different methods described herein may be at least partly different. Some of the data structures that may evolve as method 44 is executed are illustrated in FIGS. 5 and 6.

Method 44 begins at 26B, where one or more artists use a 3DCCT to rough out a relatively low-resolution structural model 28 of graphical environment 12, substantially as described above. The term 'resolution' may be used to describe the degree of granularity of a structural model, as reflected in the underlying structure data. As used herein the 'resolution' of the structural model includes a measure of the density of polygons and vertices it comprises, with structural models of finer resolution comprising a greater density of polygons and vertices. The term 'resolution' may also refer to a pixel density of colors and/or textures applied to the polygons, with increased pixel densities corresponding to finer resolutions.

Method 44 advances to 46, where the structural model is divided into a plurality of sections, each section comprising one or more clusters. The structural model may be divided in any way that makes further processing more convenient or efficient. For example, it may be divided into different sections to be refined further by different artists. In one embodiment, however, the structural model may be divided into sections, such that the clusters of each section have a comparable desired resolution. This scenario is illustrated in FIG. 5, where structural model 28 is divided into a plurality of sections, which include section 48A, section 48B, and section 48C.

Method 44 then advances to 50, where each section of structural model 28 is imported into a mega-mesh editing tool (MMET). In one embodiment, the sections may be imported with the aid of a plug-in module of the MMET configured to run from within the 3DCCT. In other embodiments, a stand-alone application or another type of service may facilitate data compatibility between the 3DCCT and the MMET. In the MMET, data derived from the structural model is represented as composite mega-mesh data (composite MMD), which is described below with reference to FIG. 7. Accordingly, the MMET receives structure data that structurally defines the graphical environment at a first resolution, i.e., the relatively low resolution of structural model 28. When the MMET receives the structure data from the 3DCCT, it stores composite MMD based on the structure data received. At this point in the process, the composite MMD may comprise only a first subset defining the graphical environment at the first resolution.

Method 44 then advances to 52, where the composite MMD representing graphical environment 12 is inspected in order to determine whether the graphical environment is satisfactorily represented. The composite MMD may be inspected in any suitable manner, by one or more artists, for example. To facilitate inspection, the composite MMD may be fed into a rendering engine to render, on a display subsystem, the graphical environment it represents. In some embodiments, an automated procedure may be used to inspect the composite MMD, as described below with reference to FIG. 8.

When 52 is first invoked, the composite MMD representing graphical environment 12 will lack color, texture, and fine-resolution detail; it will not satisfactorily represent the graphical environment. If it is determined that the graphical environment is not satisfactorily represented, then method 44 advances to 54, where a section of the structural model— section 48A, section 48B, or section 48C, for example—is exported to a three-dimensional sculpting tool (3DST) and sculpted from within the 3DST to provide further refinement. Exporting only one section at a time ensures that the editing capacity of the 3DST in terms of numbers of polygons or numbers of vertices will not be exceeded. In addition, exporting sections of comparable desired resolution ensures that the artist will not have to work with clusters of widely varying length scales simultaneously. In terms of the underlying data structure, exporting the section of the structural model comprises exporting section-localized data based on the composite MMD, the section-localized data defining a section of the graphical environment at least structurally.

The 3DST may be any external, interactive, three-dimensional sculpting tool configured to output coordinates of a plurality of vertices of a plurality of polygons spanning the exported section, and further configured to output a surface aspect of the section. Using this editing tool, an artist may sculpt the section to a finer resolution, i.e., to increase the number and/or decrease the size of the polygons it comprises. Further, the 3DST may allow the artist to add color, texture, or virtually any surface aspect to the faces of polygons. Refinement of a series of sections via the 3DST yields a corresponding series of refined sections, such as refined sections 56A, 56B, and 56C shown in FIG. 6. Any section of the graphical environment refined by the 3DST may be represented as refined section-localized data, which defines the section of the graphical environment both structurally and superficially. Defining the graphical environment superficially may comprise defining, for each of the plurality of polygons, a surface aspect comprising one or more of a color aspect, a texture aspect, and an offset relative to a surface of the polygon. In one embodiment, the refined section-localized data may be a native data format of the 3DST. 3DST's suitable for this purpose include software applications used to form characters for video games and other computer-generated animation. One example 3DST is ZBrush®, a product of Pixologic, Inc.

At 58, it is determined whether further colorizing and/or texturizing of the section using a 2DIET is desired. If further colorizing and/or texturizing is desired, then at 32B, that section alone undergoes a uv unwrapping procedure to generate a section of canvas that can be edited using the 2DIET. Such editing may be used, for example, to add writing or a pattern to various parts of the refined image. Then, at 36B, the desired color and/or texture is added to the section of canvas to generate a surface map of the section. At 60, the surface map of the section is rewrapped onto the refined section to provide an appropriately colorized and/or texturized refined section within the 3DST.

After the rewrapping procedure, or if no further surface modification was desired at 58, the refined section, at 50, is re-imported (i.e., received back) into the MMET. In terms of the underlying data structure, re-importing the section may comprise receiving refined section-localized data defining a section of the graphical environment at a second resolution finer than the first resolution. At this stage of the process, the MMET adds the refined section to pre-existing lower-resolution parts of the structural model, as further described below. Adding the refined section to the pre-existing lower-resolution parts of the structural model may comprise augmenting the composite MMD to include a second subset, which, in combination with the first subset, defines at least the refined section at the second resolution, according to the refined section-localized data received. Thus, constructing the composite MMD may comprise augmenting previously stored composite MMD based on the refined section-localized data.

It will be understood that the illustrated method is entirely compatible with scenarios in which a plurality of artists contribute to an evolving, composite MMD, and in fact, the MMET may in some embodiments be particularly configured to manage version control in such scenarios. For example, the MMET may allow multiple artists to edit the same section of graphical environment 12 either severally or with overlapping durations. This feature is not offered by pre-existing 3DCCT's, effectively limiting their usefulness to small, discrete objects such as characters, as opposed to environments. In one particular embodiment, refined sections of the graphical environment may be imported to the MMET with a "read only" attribute set. If a section of the environment is available for editing, artists can "check them out" (making them writable) and work on them locally, inspect the changes and submit them to an authoritative version, on server 16, for example.

The MMET may be configured to maintain information about how the various sections of graphical environment 12 are connected together. Accordingly, the MMET will be able to reconcile any discontinuities which could arise from two different artists working simultaneously on adjacent sections, when they are checked into the server machine. Further, the MMET may track any changes and make sure that seams between edges of adjacent sections are stitched together, thereby preventing gaps appearing between them.

Figure 7:
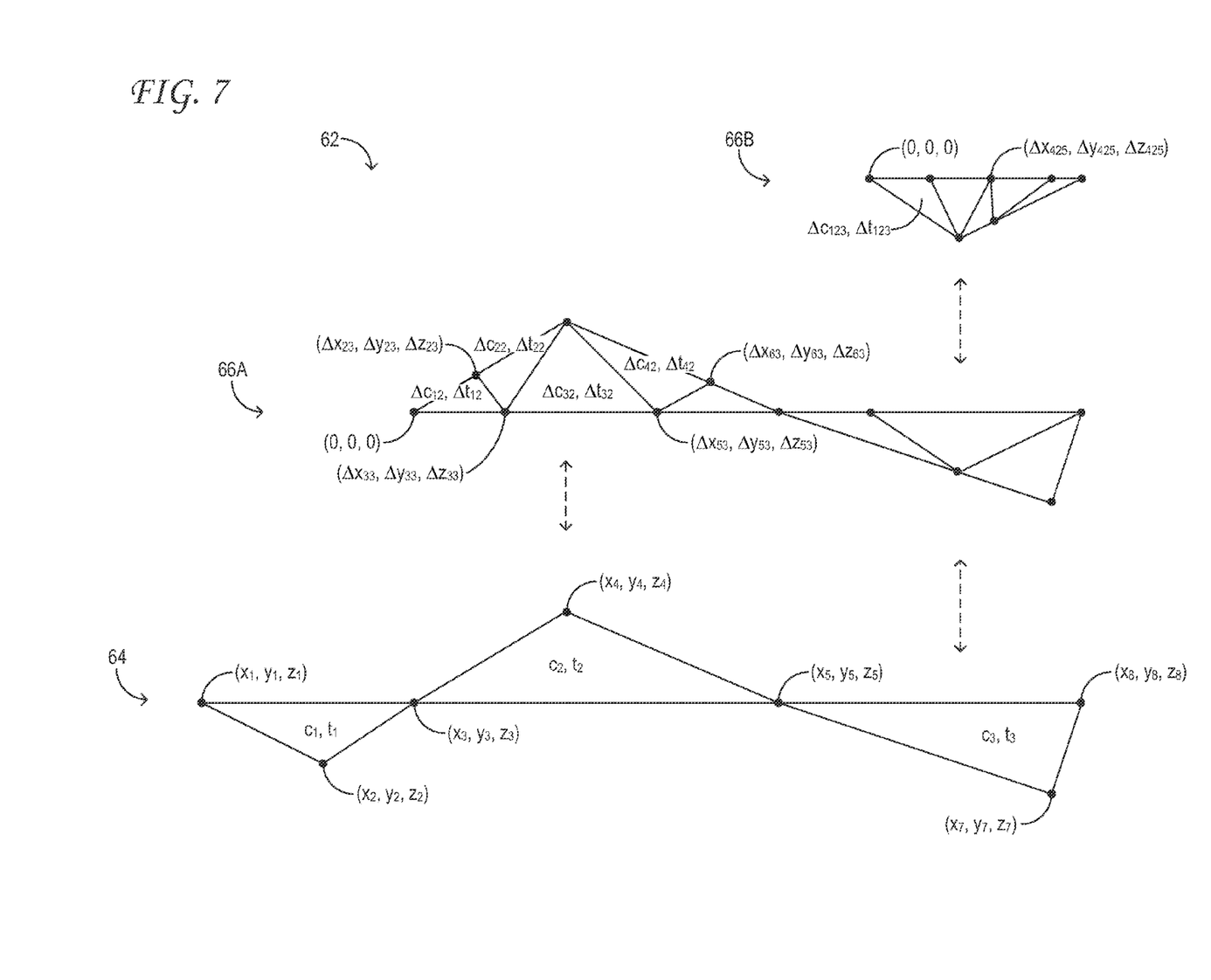
FIG. 7 schematically represents a data structure of composite mega-mesh data (composite MMD) in accordance with an embodiment of the present disclosure.

FIG. 7 schematically represents a data structure of composite MMD 62 in one example embodiment. During execution of method 44, composite MMD defining graphical environment 12 is constructed and stored. In one embodiment, the composite MMD comprises a first subset, which defines the graphical environment at a first resolution, and a second subset, which, in combination with the first subset, defines at least a section of the graphical environment at a second resolution finer than the first resolution. Accordingly, the composite MMD may define at least two different sections of the graphical environment at different resolutions.

Composite MMD 62 comprises a low-resolution base layer 64 and a series of finer-resolution augmenting layers, of which the first two—augmenting layers 66A and 66B—are represented in the drawing. The base layer includes a representation of the array of polygons in structural model 28. The representation includes the coordinates of the vertices of each polygon and further reflects surface aspects such as color and texture. For purposes of illustration, the surface aspects are represented by the ordered pair ($c_i$, $t_i$) shown within each polygon of the base layer. It will be understood however, that the range of surface aspects represented in the composite MMD may vary from one embodiment to the next, and, in some embodiments, more than two numbers may be used to represent them.

Augmenting layer 66A includes a representation of a minor subset of the array of the polygons in base layer 64. For purposes of illustration, these polygons are shown above and in registry with the corresponding polygons of the base layer. Each augmenting layer may impart a finer resolution to select regions of the composite MMD than the layer below it. Accordingly, the polygons of augmenting layer 66A are subdivided into smaller polygons whose coordinates are identified relative to the coordinates of the subdivided polygons of base layer 64. Like base layer 64, augmenting layer 66A reflects surface aspects such as color and texture, in addition to the vertex coordinates. In augmenting layers, however, these aspects are stored as increments over the values assigned in the base layer.

Continuing in FIG. 7, augmenting layer 66B imparts an even finer resolution to select regions of the composite MMD, relative to augmenting layer 66A. In augmenting layer 66B, vertex coordinates and surface aspects are stored as increments over their respective accumulated values as represented in base layer 64 and any intervening augmenting layers (e.g., augmenting layer 66A). In this manner, a seamless, model is obtained in which different regions of graphical environment 12 can have different resolutions.

Significant time savings and/or quality enhancements accrue by representing surface aspects in this manner. Suppose, for example, that an entire graphical environment is sculpted and colorized to fine resolution. Then, when the graphical environment is examined, it is found to be too dark over a large region comprising fine-resolution color detail. With layers of composite MMD arranged hierarchically, as presently disclosed, it is possible to lighten the color aspects of the polygons of the coarse-resolution base layer (e.g., base layer 64) without disturbing fine-resolution color detail encoded in the augmenting layers. When the graphical environment is re-rendered, the fine-resolution detail will still be present throughout the large region, but will be rendered in an overall lighter hue.

In addition, this inventive approach for representing a graphical environment allows different sections of the same, unitary model to be worked up to different levels of detail. After a particular section of the graphical environment is exported to the 3DST and worked up, for instance, the part of the graphical environment that is exterior to that particular section remains defined as in the previously stored composite MMD. This issues from the fact that different polygons in base layer 58 may be further defined by different numbers of augmenting layers.

Returning now to FIG. 4, when it is determined at 52 that the graphical environment is satisfactorily represented, method 44 advances to 68, where various data sets are extracted from the composite MMD via a uv unwrapping and auto-painting procedure and, at 42B, are exported in a format recognizable by the end-use application. Such data sets may include structure data that structurally defines the graphical environment (akin to structural model 28, for example) and surface data that superficially defines the graphical environment (akin to surface map 38), where the structure data and the surface data are both based on the composite MMD. In some embodiments, the structure data and the surface data may be video-game assets used by a video game to render at least some graphical content of the video game. Further, the surface data may include one or more automatically colored and/or texturized surface maps—a virtual-texture normal map, a virtual-texture spec/alpha map, and a virtual-texture diffuse map, for example. In some embodiments, two or more of the surface maps may be combined in a composite MMD set. In automatically forming the one or more surface maps, at 68, the MMET may use the full resolution available in the composite MMD, or it may use a lower resolution, as further described below.

Figure 8:
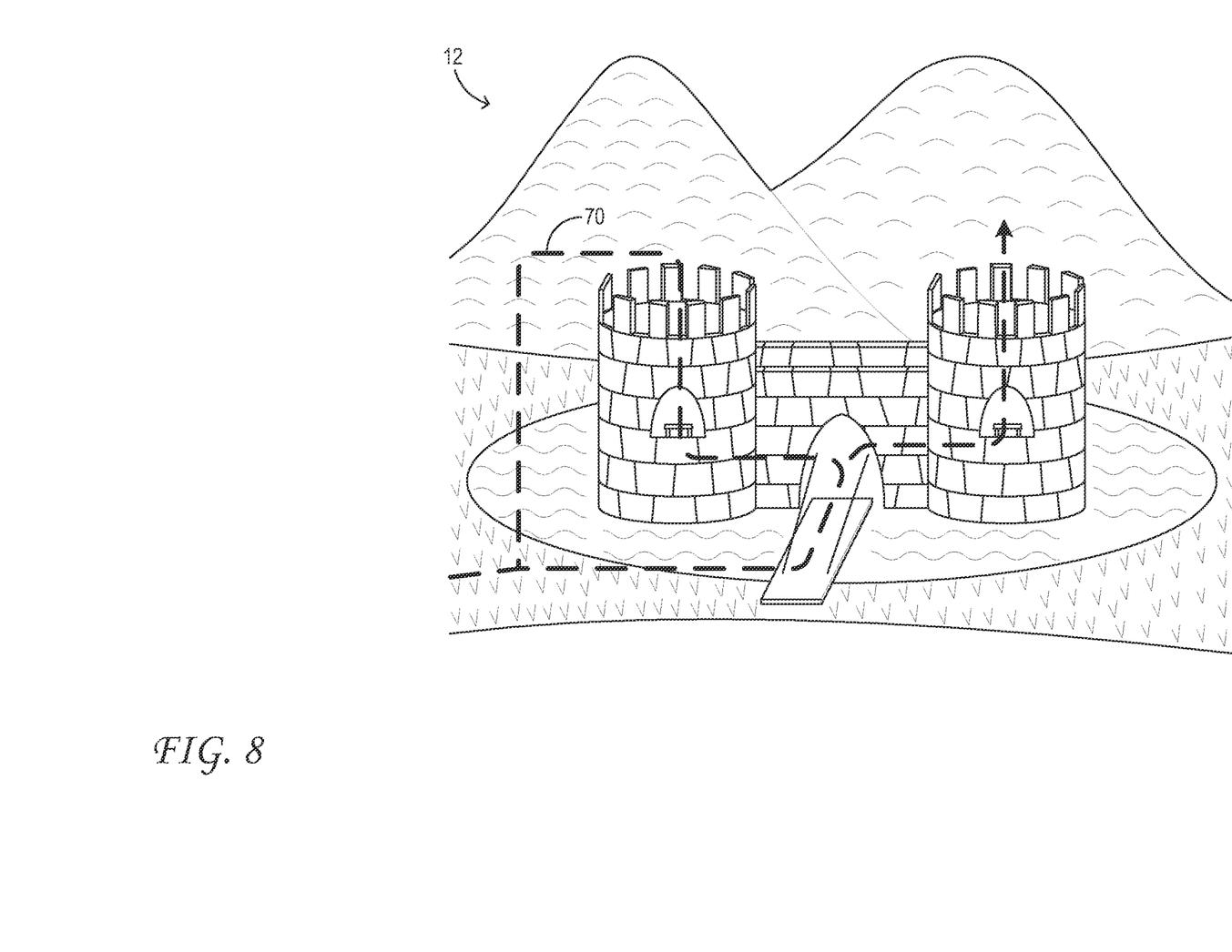
FIG. 8 shows a perspective view of a graphical environment and a travel path through the graphical environment in accordance with an embodiment of the present disclosure.

FIG. 8 shows a perspective view of graphical environment 12 in one example embodiment. The graphical environment includes various features, which could be represented at widely different resolutions, as described above. In principle, a visitor to the graphical environment could observe any of these features from any point of view—from a range of angles, and, a range of distances at each angle. Nevertheless, the end-use application may restrict the range of points of view from which the visitor may view the various features. To illustrate this principle, FIG. 8 shows a travel path 70 that a visitor may take through graphical environment 12 in the course of using the end-use application. The travel path restricts the range of the visitor's point of view with respect to the various features of the graphical environment by defining the distance of closest approach between the visitor and each feature of the graphical environment. It therefore determines, for each feature of the graphical environment, the coarsest acceptable resolution of that feature: the more closely the visitor approaches a feature, the finer its resolution should be. Accordingly, the coarsest acceptable resolution may differ in at least two different regions of the graphical environment.

Certain advantages accrue from matching the renderable resolution of particular regions of the graphical environment to their coarsest acceptable resolution. If the renderable resolution is lower than the coarsest acceptable resolution for a region, then a visitor to the environment may find that region of the environment poorly rendered. Conversely, if the renderable resolution far exceeds the coarsest acceptable resolution in a region of the graphical environment, then that region may be represented in a manner that wastes system resources (memory, processor ticks, etc.). Therefore, a resolution matching procedure based on a travel path or other estimation of view points may be used at 52 of method 44, to determine whether a given part of the composite MMD is represented satisfactorily. In the resolution-matching procedure, the desired resolution is computed based on the distance of closest approach between the two different regions and a path travelled through the graphical environment during execution of an end-use application that renders the graphical environment.

Figure 9:
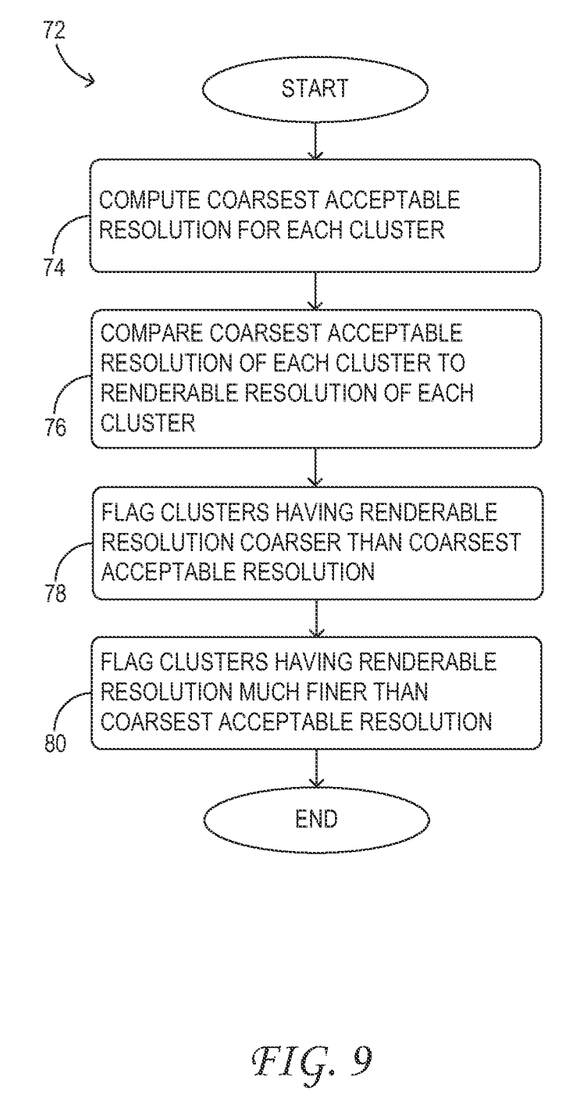
FIG. 9 illustrates a resolution-matching method in accordance with an embodiment of the present disclosure.

FIG. 9 illustrates such a method in one example embodiment. Method 72 begins at 74, where the coarsest acceptable resolution for each cluster of the composite MMD is computed. The coarsest acceptable resolution may be computed by stepping through each locus in travel path 70, and for each locus, looping through each cluster of the composite MMD. For each cluster of the composite MMD, the coarsest acceptable resolution based on the given locus may be computed. Then, the locus-specific value may be compared to a running value of the coarsest acceptable resolution for all loci considered, and if finer in resolution, the locus-specific value may replace the running value. This procedure may be repeated for all clusters in the composite MMD and for all loci of the travel path.

Method 72 then advances to 76, where the coarsest acceptable resolution of each cluster of the graphical environment is compared to a renderable resolution of each cluster. In terms of the underlying data structure, the renderable resolution may be determined by the resolution of the surface data corresponding to one or more regions of the graphical environment. The method then advances to 78, where regions of the composite MMD having a renderable resolution coarser than coarsest acceptable resolution are flagged for further refinement. The method then advances to 80, where regions of the composite MMD having a renderable resolution much finer than the coarsest acceptable resolution are flagged for averaging. In some embodiments, process steps 72, 74 and 78 may be enacted together, by looping through each cluster of the composite MMD, and for each cluster, comparing the renderable resolution to the accumulated coarsest acceptable resolution computed at 74.

After the above procedure is executed, one or more artists may review the flagged regions of the graphical environment. In regions where the resolution is too high, an artist may reduce the polygon density of one or more clusters by invoking any suitable averaging procedure. In regions where the resolution is too low, the artist may increase the polygon density of one or more clusters by further work-up in the 3DST, for example. In other words, the composite MMD may be edited so that the renderable resolution more closely approximates the desired resolution for one or more regions of the graphical environment.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. Enacted in a mega-mesh editing tool of a computer system, a method for sculpting a three-dimensional, graphical environment, comprising:
   receiving structure data that structurally defines the graphical environment in three dimensions at a first resolution;
   storing composite data based on the structure data received, the composite data comprising a first subset defining the graphical environment at the first resolution;
   exporting section-localized data based on the composite data to a three-dimensional sculpting tool external to the mega-mesh editing tool, the sculpting tool configured to output three-dimensional coordinates of a plurality of vertices of a plurality of polygons spanning a section, the section-localized data defining the section of the graphical environment at least structurally;
   receiving from the three-dimensional sculpting tool refined section-localized data defining the section of the graphical environment at a second resolution finer than the first resolution;
   augmenting the composite data to include a second subset, which, in combination with the first subset, defines at least the section at the second resolution, according to the refined section-localized data received.

2. The method of claim 1, wherein the structure data is received from an external three-dimensional content-creation tool configured to output three-dimensional coordinates of a plurality of vertices of a plurality of polygons spanning the graphical environment.

3. The method of claim 1, wherein the three-dimensional sculpting tool is further configured to output a surface aspect of the section.

4. The method of claim 1, wherein the refined section-localized data defines the section both structurally and superficially, wherein defining the section structurally comprises defining three-dimensional coordinates of a plurality of vertices of a plurality of polygons spanning the section, and wherein defining the section superficially comprises defining, for each of the plurality of polygons, a surface aspect comprising one or more of a color aspect, a texture aspect, and an offset relative to a surface of the polygon.

5. The method of claim 1, further comprising exporting three-dimensional structure data that structurally defines the graphical environment and surface data that superficially defines the graphical environment, wherein the three-dimensional structure data and the surface data are based on the composite data.

6. The method of claim 5, wherein the three-dimensional structure data and the surface data are assets used by a video game to render at least some graphical content of the video game.

7. The method of claim 5, wherein the three-dimensional surface data comprises one or more of a virtual-texture normal map, a virtual-texture spec/alpha map, and a virtual-texture diffuse map.

8. The method of claim 1 further comprising unwrapping only the section-localized data to form a canvas section.

9. The method of claim 8 wherein the canvas section is painted subsequent to the unwrapping using a two-dimensional image editing tool.

10. The method of claim 9 further comprising rewrapping the painted canvas section to form the refined section-localized data.

11. Enacted in a mega-mesh editing tool of a computer system having a data-holding subsystem, a method for sculpting a three-dimensional, graphical environment, comprising:
receiving section-localized data that structurally and superficially defines a section of the graphical environment;
augmenting previously stored composite data based on the section-localized data, the graphical environment exterior to the section remaining defined as in the previously stored composite data after the previously stored composite data is augmented;
constructing new composite data that defines the graphical environment structurally including defining coordinates of a plurality of vertices of a plurality of polygons spanning the graphical environment, and defines the graphical environment superficially including defining for each of the plurality of polygons a surface aspect comprising one or more of a color aspect, a texture aspect, and an offset relative to a surface of the polygon, the new composite data including a first subset, which defines the graphical environment at a first resolution, and a second subset, which, in combination with the first subset, defines at least the section of the graphical environment at a second resolution finer than the first resolution; and
storing the new composite data on the data-holding subsystem.

12. The method of claim 11, wherein the new composite data defines at least two different sections of the graphical environment at different resolutions.

13. The method of claim 11, further comprising receiving structure data that structurally defines the graphical environment at the first resolution, wherein the new composite data is constructed based in part on the structure data.

14. The method of claim 11, further comprising exporting section-localized data that structurally and superficially defines the section of the graphical environment, wherein the section-localized data is based on the new composite data.

15. The method of claim 11, further comprising exporting structure data that structurally defines the graphical environment and surface data that superficially defines the graphical environment, wherein the structure data and the surface data are based on the new composite data.

16. The method of claim 15, further comprising comparing a renderable resolution of the surface data corresponding to one or more regions of the graphical environment to a desired resolution, and flagging the surface data in regions where the renderable resolution differs from the desired resolution.

17. The method of claim 16, wherein the desired resolution differs in at least two different regions of the graphical environment, and wherein the desired resolution is computed based on a distance of closest approach between a given region of the graphical environment and a path travelled through the graphical environment during execution of an end-use application that renders the graphical environment.

18. Enacted in a mega-mesh editing tool of a computer system, a method for sculpting three-dimensional, graphical content for a video game, the method comprising:
receiving rough structure data that structurally defines a three-dimensional graphical environment at a first resolution;
storing composite data based on the rough structure data received, the composite data comprising a first subset defining the graphical environment at the first resolution;
exporting section-localized data based on the composite data to a three-dimensional sculpting tool external to the mega-mesh editing tool, the sculpting tool configured to output three-dimensional coordinates of a plurality of vertices of a plurality of polygons spanning a section, the section-localized data defining the section of the graphical environment at least structurally;
receiving from the three-dimensional sculpting tool refined section-localized data defining the section of the graphical environment at a second resolution finer than the first resolution;
augmenting the composite data to include a second subset, which, in combination with the first subset, defines at least the section at the second resolution, according to the refined section-localized data received;
exporting a structure-defining video-game asset that structurally defines the graphical environment and surface-defining video-game asset that superficially defines the graphical environment, wherein the structure data and the surface data are based on the composite data.

19. The method of claim 18, further comprising comparing the renderable resolution of the surface-defining video-game asset corresponding to one or more regions of the graphical environment to a desired resolution, wherein the desired resolution differs in at least two different regions of the graphical environment, and wherein the desired resolution is computed based on a distance of closest approach between a given region of the graphical environment and a path travelled through the graphical environment during execution of the video game.

20. The method of claim 19, further comprising editing the composite data so that the renderable resolution more closely approximates the desired resolution in one or more regions of the graphical environment.

* * * * *